United States Patent [19]

Uchikura

[11] Patent Number: 5,509,047
[45] Date of Patent: Apr. 16, 1996

[54] PORTABLE RADIO TELEPHONE AND METHOD FOR SELECTING RADIO CHANNEL OF CHEAP FEE

[75] Inventor: Takao Uchikura, Tokyo, Japan

[73] Assignee: Casio Computer Co., Ltd., Tokyo, Japan

[21] Appl. No.: 40,102

[22] Filed: Mar. 30, 1993

[30] Foreign Application Priority Data

Mar. 31, 1992 [JP] Japan ................................ 4-077625

[51] Int. Cl.⁶ ........................................... H04Q 7/32
[52] U.S. Cl. .......................... 379/58; 379/61; 455/341; 455/54.1
[58] Field of Search ................................ 379/58, 59, 61; 455/33.1, 34.1, 54.1

[56] References Cited

U.S. PATENT DOCUMENTS

| | | | |
|---|---|---|---|
| 4,989,230 | 1/1991 | Gillig et al. ........................... | 379/59 |
| 5,260,988 | 11/1993 | Schellinger et al. .................. | 379/59 |
| 5,309,502 | 5/1994 | Hirai ...................................... | 379/61 |

FOREIGN PATENT DOCUMENTS 0462601  12/1991  European Pat. Off. .

OTHER PUBLICATIONS

World publication, WO 84/00654, Feb. 1984, Puhl et al.

Primary Examiner—Dwayne D. Bost
Attorney, Agent, or Firm—Frishauf, Holtz, Goodman, Langer & Chick

[57] ABSTRACT

A radio telephone system is arranged by a communication network, a cordless telephone, and a plurality of public radio base stations, which are connected to the communication network, a portable terminal of this cordless telephone is communicatable with not only a radio base station of this cordless telephone, but also the plural public radio base stations. The portable terminal searches for an ID code of a relevant radio base station contained in the received radio signal, and determines whether or not the received radio signal corresponds to a radio signal transmitted from the cordless telephone to which this portable terminal belongs. The the ID code is searched for when a power supply is turned ON and a telephone call is made. The portable terminal sets a radio channel between the radio base station for the cordless telephone to which this portable terminal belongs and this portable terminal when the ID code of the radio base station for this cordless telephone is detected. Thus, when a telephone call is made, a telephone communication can be made by the portable terminal via the radio base station of this cordless telephone, resulting in a low-cost telephone communication.

20 Claims, 8 Drawing Sheets

RAM

| CARRIER NO. | SLOT NO. | TRANSMISSION PERIOD INFORMATION | ID CODE OF PUBLIC RADIO STATION |
|---|---|---|---|

FIG.3

RAM

| | CARRIER NO. | SLOT NO. | TRANSMISSION PERIOD INFORMATION | ID CODE OF PUBLIC RADIO STATION |
|---|---|---|---|---|
| CHM1 | CARRIER NO. | SLOT NO. | TRANSMISSION PERIOD INFORMATION | |
| CHM2 | CARRIER NO. | SLOT NO. | TRANSMISSION PERIOD INFORMATION | ID CODE OF PUBLIC RADIO STATION |

FIG.7

PORTABLE RADIO TELEPHONE AND METHOD FOR SELECTING RADIO CHANNEL OF CHEAP FEE

BACKGROUND OF THE INVENTION

1. Field of the Invention

The present invention generally relates to a radio telephone and a method for selecting a radio channel. More specifically, the present invention is directed to a radio telephone system in which a portable radio telephone of a private-use radio telephone apparatus connected to a telephone communication network, can communicate also with a public-use radio base station connected to the communication network.

2. Description of the Prior Art

The above-described private-use radio telephone apparatus is known as a so-called "cordless telephone" used in a home, and also a so-termed "system cordless telephone" utilized in a firm. This radio telephone system has been developed in Japan as a second-generation cordless telephone system. In the second-generation cordless telephone system, a plurality of public radio base stations and a control center for controlling communications via these public radio base stations, are connected to the presently available communication network, namely, a PSTN (Public Switched Telephone Network) or an ISDN (Integrated Services Digital Network). To this communication network, cordless telephones used in homes and offices are connected. The portable telephone terminals (radio telephones) of these cordless telephones are registered in the control center in order that these portable telephone terminals can also be operated outside the homes and offices. In other words, a portable telephone terminal of a cordless telephone apparatus is operable as a handset of this cordless telephone apparatus while this portable telephone terminal is used within a range covered by a home, or a firm, and furthermore, the portable telephone terminal is operable like a "cellular phone" while this portable telephone terminal is brought out from the home or firm in the second-generation cordless telephone system.

Also in this second generation cordless telephone system, a radio telephone is designed to intermittently receive control channel information in synchronism with a transmission period of a radio base station in a similar manner to that of the normal portable radio telephone system. This control channel information is similarly, intermittently transmitted from the radio base station, and contains such information to require a telephone call.

Under such a circumstance, first of all, one receiving method for a portable terminal of a cordless telephone apparatus which has been registered into the control center may be conceived such that both of control channel information with regard to the radio base station of the cordless telephone apparatus (simply referred to a "private radio base station" hereinafter) and the public radio base station are received at the same time. Even if the portable terminal would be designed to be receivable both of the control channel information for the different radio base stations, while this portable terminal is brought out from a home or office, the control channel information of the private radio base station can be hardly received and useless power thereof is consumed.

As a consequence, it is preferable for the portable terminal receiving method to receive the control channel information from the private radio base station when the portable terminal is operated within the home or office, and also to receive the control channel information of the public radio base station when the portable terminal is brought out from the home or office. One possible and simple receiving method is conceived to achieve the above-described preferable conditions. That is, a selecting switch may be employed and manipulated to receive only one control channel information.

However, in this case, the following drawback may be caused under such an environment that both of the control channel information transmitted from the private radio base station and the public radio base station can be received, namely if the selecting switch provided in the portable terminal would be selected to receive the signal derived from the public radio base station and this portable terminal would be operated near the home, or office. That is, when a telephone call is made, although this telephone call could be made by the portable terminal via the private radio base station at a free communication cost, this telephone call is made via the public radio base station and therefore requires a certain amount of communication fee. As a result, a total communication fee becomes expensive.

SUMMARY OF THE INVENTION

The present invention has been made in an attempt to solve the above-described drawbacks, and therefore, has an object to provide a portable telephone capable of making a telephone call via a private radio base station under such a communication condition that this portable telephone can communicate with any one of the private radio base station and also the public radio base station.

A further object of the present invention is to provide a method for selecting a radio channel, which is suitable to suppress a communication cost at a cheap fee when a telephone call is made.

A radio telephone system, according to the present invention, comprises:

- a private radio telephone unit constructed of at least one portable telephone and one private radio base station;
- a plurality of public radio base stations; and
- a communication network for connecting said private radio telephone unit with said plural public radio base stations, said portable telephone including a base station selecting means for selecting said private radio base station at a top priority as a telecommunication station when a telephone call is made, and said portable telephone being capable of communicating with not only said private radio base station, but also said public radio base stations.

BRIEF DESCRIPTION OF THE DRAWINGS

These and other objects and features of the present invention will become apparent with reference to the following specification and to the drawings, in which:

FIG. 3 schematically illustrates an arrangement of a channel memory employed in a portable telephone according to a second preferred embodiment of the present invention;

FIG. 7 schematically shows an arrangement of a channel memory employed in a portable telephone according to a third preferred embodiment of the present invention;

DETAILED DESCRIPTION OF THE PREFERRED EMBODIMENTS

ARRANGEMENT OF FIRST PORTABLE TELEPHONE

Figure 1:
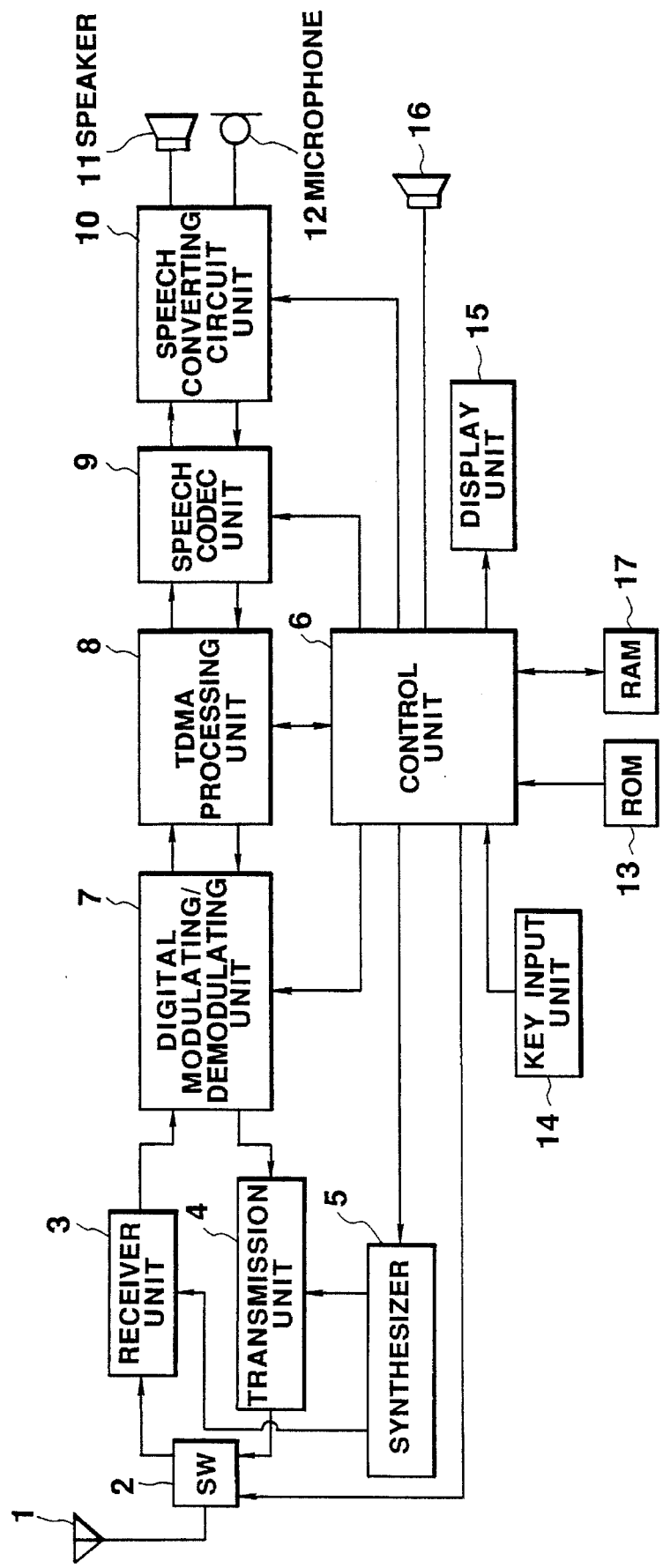
FIG. 1 is a schematic block circuit diagram of a portable telephone according to a first preferred embodiment of the present invention.
Figure 2:
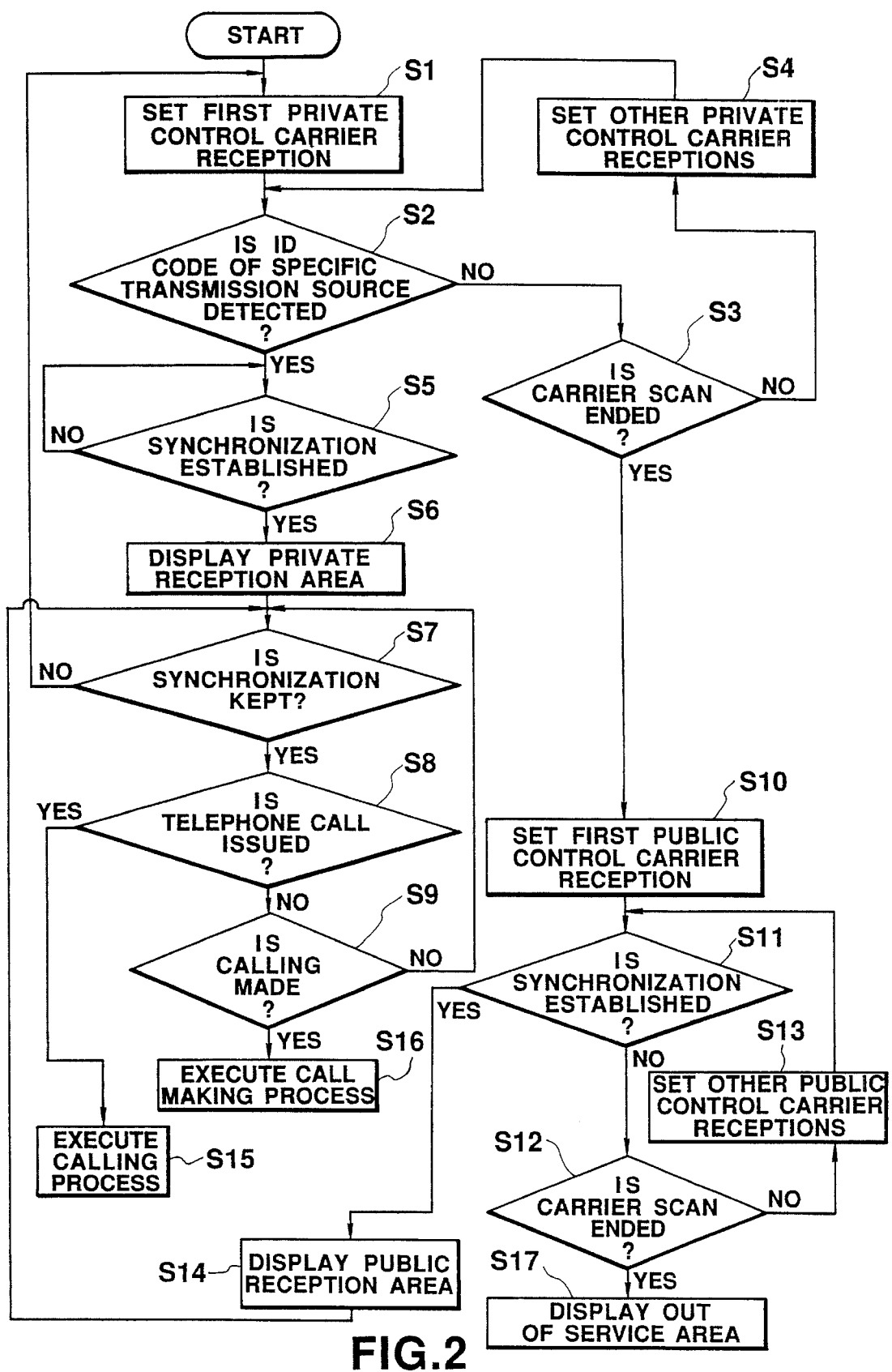
FIG. 2 is a flow chart for representing a process operation performed when a reception channel is set.

Referring now to FIGS. 1 to 2, an arrangement of a portable telephone according to a first preferred embodiment of the present invention will be described. A major feature of this first portable telephone is such that a private reception channel is set with a top priority.

FIG. 1 schematically shows a circuit arrangement of the first portable telephone used in the second generation cordless telephone system. A signal transmission system performed between a radio base station and a portable telephone in such a second generation cordless telephone system, is of the TDMA-TDD (Time Division Multiplex Access-Time Division Duplex) system in which a voice signal is also converted into digital data to be transmitted/received.

In the circuit arrangement of FIG. 1, reference numeral 1 indicates an antenna and reference numeral 2 denotes a switch for switching transmission and reception. This switch 2 is set to normally connect the antenna 1 with a receiver unit 3, and is used to connect the antenna 1 to a transmission unit 4 during the transmission operation. A reception frequency of the receiver unit 3 and a transmission frequency of the transmission unit 4 are defined by an oscillation frequency of a synthesizer 5. The oscillation frequency of the synthesizer 5 is selected by a control unit 6. A digital modulation/demodulation unit 7 corresponds to such a circuit arrangement that a digital modulation signal derived from a radio base station and received by the receiver unit 3 is demodulated and the demodulated signal is outputted to a TDMA processing unit 8, and a carrier is modulated by the digital data outputted from the TDMA processing circuit 8 and the modulated carrier is outputted to the transmission unit 4. TDMA processing unit 8 is such a circuit unit for processing the transmission/reception data based on the above-described TDMA-TDD data transmission system. In a concrete operation of this TDMA processing unit 8, a real data portion is extracted from signal data which has been received from the radio base station at a predetermined time slot. Then, when the real data corresponds to the control data, this control data is sent to a control unit 6. When the real data corresponds to speech data, this speech data is supplied to a speech coder/decoder unit (speech CODEC unit) 9. Furthermore, this TDMA processing unit 8 adds a header portion to the speech data derived from the speech CODEC unit 9 or the control data derived from the control unit 6, so that said data owns a predetermined format. Thereafter, the resultant data is inserted into a predetermined time slot, which is finally supplied to a digital modulation/demodulation unit 7. It should be noted that when the above-described digital data received corresponds to the data received in the control channel, the control data to be supplied to the control unit 6 are an ID (identification) code of the radio base station indicative of a transmission source, transmission period information representative of a signal transmission period, another ID code of the portable telephone functioning as a calling number, and so on. When the above-described control data outputted from the control unit 6 corresponds to the transmission data at the control channel, this control data is an ID code of the portable telephone indicative of a transmission source, another ID code of the radio base station representative of a transmission destination, and a calling demand code etc. The speech CODEC unit 9 is such a circuit unit for expanding digital speech data which has been data-compressed in accordance with the ADPCM (Adaptive Differential Pulse Code Modulation) method and sent from the TDMA processing unit 8, to obtain original data. The resultant original data is supplied to a speech converting circuit unit 10. Also, digital speech data produced in the speech converting circuit unit 10 is compressed in accordance with the ADPCM method and the compressed speech data is supplied to the TDMA processing unit 8. The speech converting circuit unit 10 is equipped with an A/D converter and a D/A converter, converts the digital speech data derived from the speech CODEC unit 9 into an analog speech signal which will then be outputted to a speaker 11, and also converts a speech signal inputted from a microphone 12 into a digital speech signal which will then be outputted to the speech CODEC unit 9. These circuit units are controlled by the control unit 6.

The control unit 6 controls the overall operations of the first portable telephone. In accordance with a program stored in a ROM 13, the control unit 6 controls the above-described various circuit units and also other circuit units (will be described later). The ROM 13 stores not only the above-described program used to control the circuit operations, but also a self-ID code allocated to this portable telephone, and the ID code of the cordless telephone or the radio base station belonging to this portable telephone. These ID codes are utilized to judge whether or not the transmission source of the calling detection signal and the received signal corresponds to the radio base station of the above-described cordless telephone.

Further, to the control unit 6, a key input unit 14, a display unit 15, a ringer 16, and a RAM 17 are connected. The key input unit 14 is to input dial data and various sorts of control commands, and is arranged by a power supply switch with 12 dialing keys; a communication start key manipulated when a telephone call is made and a telephone call is accepted; a communication end key manipulated when a telephone communication is ended; a telephone line selecting key; an extension line selecting key, and a reception channel resetting key. Dialing data inputted from the key input unit 14 is outputted via the control unit 6 to the TDMA processing unit 8, transmitted from the antenna 1 to the radio base station, and also sent to the display unit 15, so that the content of this dialing data is displayed on the display unit 15. The ringer 16 is employed to announce a telephone call, and is driven only when the received calling number is coincident with the self-ID code stored in the ROM 13. The RAM 17 is to store various sorts of data, for instance, transmission period information of a radio base station received in a control channel.

In the first portable telephone with the above-described circuit arrangement, a private control channel can be set with a top priority as the reception channel by turning ON the power supply switch, or resetting the reception channel. As to this setting operation of the reception channel, a detailed operation thereof will be explained with reference to FIG. 2.

Once the private control channel or the public control channel has been set as the reception channel, a reception waiting state will be set.

Under this reception waiting condition, when a telephone call is made, namely the received calling number is coincident with the self ID code previously stored in the ROM 13, the ringer 16 is driven. When a user of this portable telephone manipulates the communication start key in response to this telephone call, a demand signal for a communication channel allocation is transmitted to the radio base station. Thereafter, the communication channel is allocated by the radio base station, and a call response signal is sent to the radio base station through the allocated communication channel. As a result, a communication line is set between this first portable telephone and another telephone from which the telephone call is made, and thereafter a telephone communication is available via the microphone 12 and the speaker 11 with the person who has made this telephone call.

Under reception waiting state, when the communication start key is manipulated, a demand signal for a communication channel allocation is sent to the radio base station. Thereafter, the communication channel is allocated by the radio base station, and the demand signal is sent to the radio base station through the allocated communication channel. Subsequently, dialing data is produced by operating the dialing key and transmitted to the radio base station. Thus, a telephone communication is set between this telephone and another telephone which has received this telephone call, and thereafter this telephone user can communicate with a person who is called via the microphone 12 and the speaker 11.

RECEPTION CHANNEL SETTING PROCESS

A process operation for setting a reception channel in the first portable telephone shown in FIG. 1, will now be described with reference to a flow chart indicated in FIG. 2. A process flow shown in FIG. 2 is commenced when the power supply switch is turned ON, or the reception channel resetting key is operated.

At a first step S1, a reception of a first private control carrier is set. More specifically, this first private control carrier setting operation is performed by setting the oscillation frequency of the synthesizer 5 to such a frequency corresponding to the first private control carrier. As a result, signals transmitted from a plurality of radio base stations of cordless telephones used in homes and firms are sequentially received by this first portable telephone. In these cordless telephones, this first control carrier is used as a carrier of the control channel (namely, this carrier transmits control information used in the radio telephone channel). Then, an ID code of a transmission source (an ID code of the relevant radio base station which has transmitted this reception signal) contained in the respective reception signals, is sent from the TDMA processing unit 8 to the control unit 6. The control unit 6 compares the ID code of the transmission source derived from the TDMA processing unit 8 with the ID code of the radio base station stored in the ROM 13, executes a process for detecting a reception of an ID code of a specific transmission source which is coincident with this ID code of the radio base station, and then makes a decision thereof at a step S2. When no detection is made within a predetermined time period that the specific ID code of the transmission source is detected, namely, when the signal transmitted from the radio base station of the cordless telephone to which this first portable telephone belongs, cannot be received, the process operation is advanced from the step S2 to a step S3 at which a judgement is made whether or not the scanning operation of all of these private control carriers has been completed. If this scanning operation of the private control carriers has not yet been accomplished, then other private control carriers are set for reception at a step S4, and then the process operation is returned to a step S2.

At the step S2, when the specific ID code of the transmission source can be detected, the process operation is advanced to a step S5 at which a check is done whether or not a synchronization has been established. In other words, it is judged whether or not such a condition is established that all of the information about the control channels intermittently transmitted from the radio base stations can be intermittently received. If the synchronization is not yet established, then the reception of the control carrier is further continued to receive the transmission period information transmitted from the radio base stations, and therefore such a synchronization can be established based on this transmission period information. At the step S5, if it is judged that the synchronization can be established, then the following processes are commenced from a step S6 to a step S9. That is, at the first step S6, such an indication is made that a telephone communication is available between this first portable telephone and the relevant private radio base station. Thereafter, another check is done whether or not the synchronization is still maintained at the step S7, a further check is made whether or not a telephone call is made at the next step S8, and also a still further check is done whether or not the key for making such a telephone call is operated at the step S9. A series of these steps S6 to S9 is repeatedly performed, namely the normal telephone call waiting condition is performed.

On the other hand, at the step S3, if it is judged that the scanning operations for all the private carriers have been completed, the process operation is advanced to a step S10 at which a reception of a first public control carrier is set. As a result, receptions are done for signals transmitted from a plurality of public radio base stations in which this first public control carrier is used as the carrier for the control channel. Next, at a step S11, a judgement is made as to whether or not a synchronization is established between this first portable telephone and any one of the public radio base stations. If no synchronization can be established between this first portable telephone and any one of the public radio stations within a predetermined time period, the process operation is advanced to a step S12 at which a check is done whether or not the scanning operations for all of the public control carriers have been ended. If the scanning operations of all of the public control carriers have not yet been accomplished, then the process operation is advanced to a step S13 at which a reception of other public control carrier is set. Subsequently, the process operation is returned to the step S11 at which the above-described process for judging whether or not the synchronization is established, is similarly performed. To the contrary, if it is detected at the step S11 that the synchronization can be done between the first portable telephone and any one of these public radio base stations, the process operation is advanced to a step S14. At this step S14, such an indication is made that a telephone communication is available between the first portable telephone and the public radio communication station. Thereafter, the process operation is advanced to the step S7 at which the above-described signal receiving state is entered.

If this synchronization becomes asynchronous under the signal reception condition, then such an asynchronous state is detected at the step S7 and the process operation is returned to the step S1 at which the process for setting the reception channel is rescheduled. Namely, even when the synchronization is established between the first portable telephone and the public radio base station, if once the asynchronous state is established, the private control channel is set with the top priority and therefore the reception channel is again set.

If a telephone call is made under the signal reception condition, then the telephone call is detected at the step S8 and the process operation is advanced to a step S15 at which a calling process for driving the ringer 16 is performed.

When the key operation for making a telephone call is performed under the signal reception condition, this telephone call is detected at the step S9 and the process operation is advanced to a step S16, at which such a telephone-call process is performed that signals for demanding a communication channel allocation and a telephone call are sent to a radio base station. This telephone-call process is done in the control channel under reception. Since the private control channel reception is performed with a top priority, the control channel used the radio base station of this cordless telephone can be firmly set as the reception channel not only when the power supply switch is turned ON, but also when the asynchronous state is established, if the place where this first portable telephone is used is located within the calling area of the cordless telephone belonging to this portable telephone. As a consequence, when a telephone call is made, this telephone call can be established under such a condition that the private control channel is set with a top priority. Furthermore, since the first portable telephone employs the reception channel resetting switch, if this channel resetting switch is operated just before a telephone call, then the private signal channel reception can be done with a top priority, so that a communication fee can be reduced, as compared with the conventional cordless telephone system.

It should be noted that when it is judged that the scan operations of all of the public control carriers have been completed at the step S12, then the process operation is advanced to a step S17 at which such an indication is made that this portable telephone is at present outside the telephone service area.

ARRANGEMENT OF SECOND PORTABLE TELEPHONE

Figure 4:
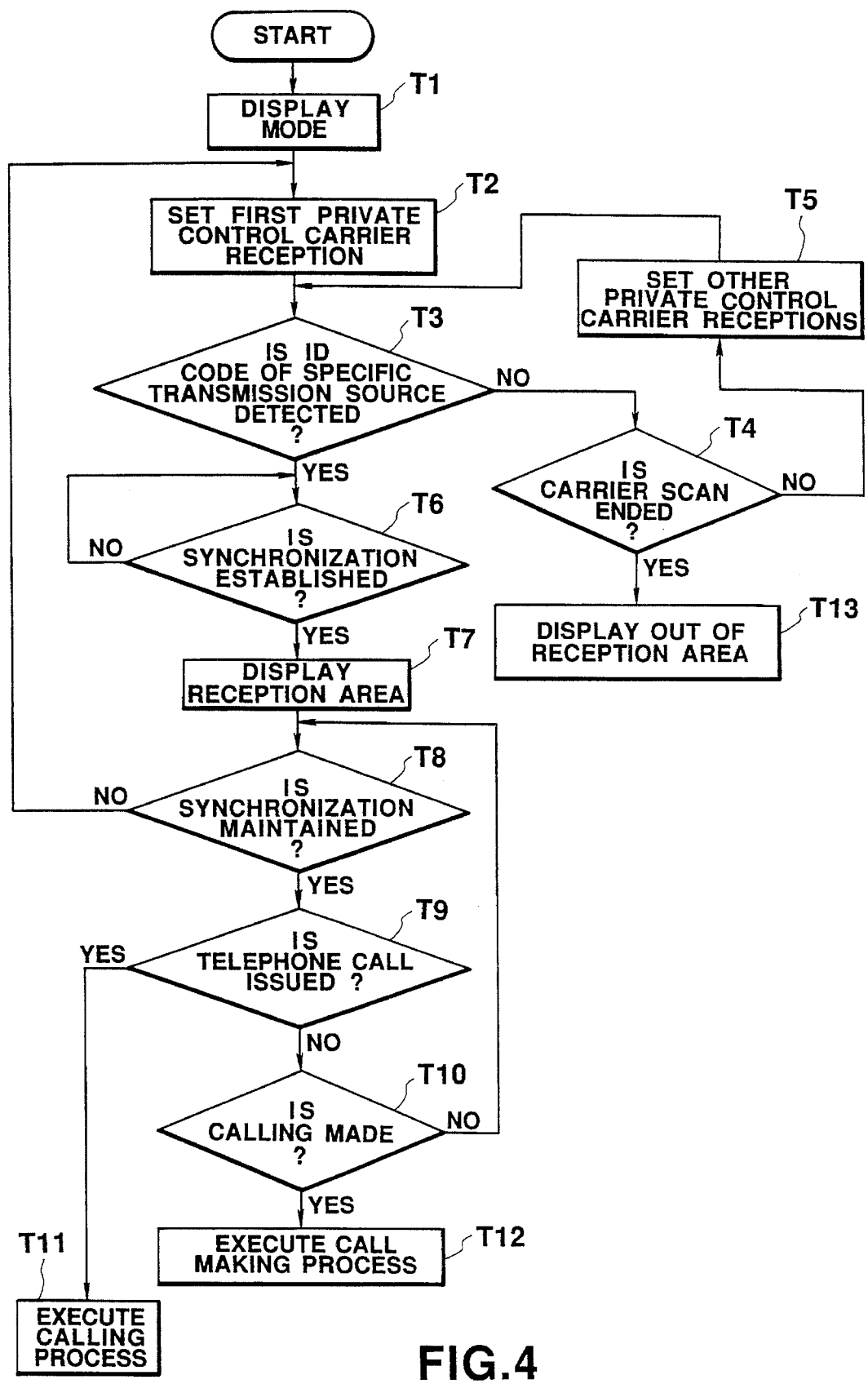
FIG. 4 is a flow chart for showing a process operation performed when a private reception channel is set.
Figure 5:
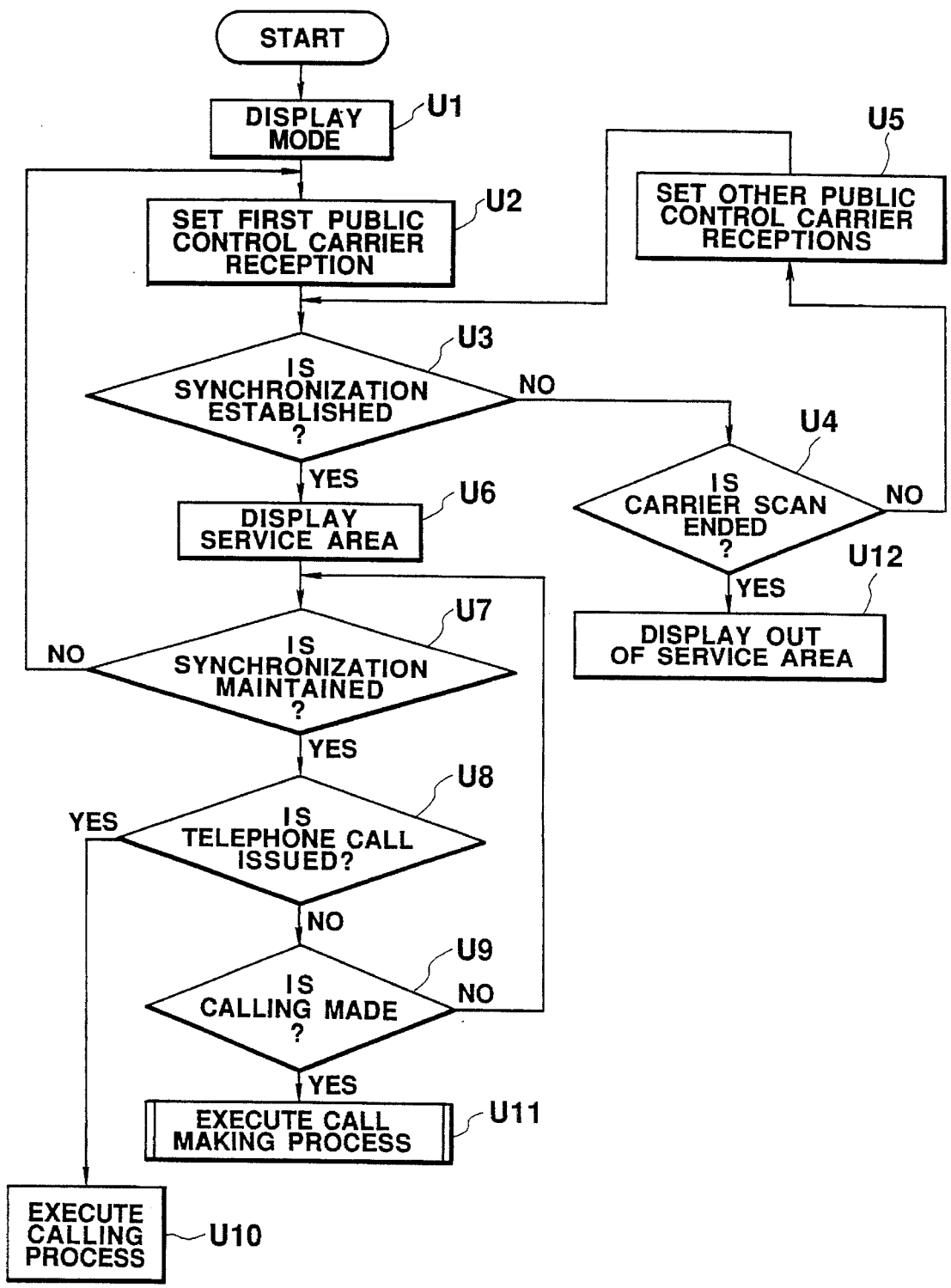
FIG. 5 is a flow chart for representing a process operation executed when a public reception channel is set.

A description will now be provided of a portable telephone according to a second preferred embodiment of the present invention with reference to FIGS. 3 to 5.

A major feature of this second portable telephone is such that a manual operable switch is employed to select as the reception channel, either the private-use control channel, or the public-use control channel. Furthermore, according to the major feature of the second portable telephone, when the public-use control channel is selected as the reception channel, a search is newly made of the private-use control channel in case that a telephone call is made.

It should be noted that since an arrangement of the second portable telephone is substantially identical to that of the first portable telephone, no illustration thereof is made, but only a different point between them will now be explained. As previously described, in case that the public control channel has been set to the reception channel of the second portable receiver, the private control channel is newly searched when the telephone call is made. As a consequence, a channel memory is provided in the above-described RAM 17, which stores information about the public control channel. This public control channel has been set as the reception channel while the search of this private control channel is commenced, and thereafter a telephone communication is ended.

FIG. 3 schematically represents a detailed structure of the above-described channel memory employed in the RAM 17. In this channel memory, such memory areas are provided for storing a carrier number and a slot number used to specify a carrier and a time slot, which are used in the public control channel. These memory areas are utilized to store transmission period information indicative of a transmission period of a control channel, and an ID code of a public radio base station.

SECOND RECEPTION CHANNEL SETTING PROCESS

A process operation for setting a reception channel in the second portable receiver will now be explained. As previously stated, in accordance with the second preferred embodiment of the present invention, the reception channel is selected to be either the private control channel, or the public control channel by manipulating the manual operable switch. In FIG. 4, there is shown a process operation for setting a reception channel when a private mode is selected by manipulating the switch. In FIG. 5, there is indicated a process operation for setting a reception channel when a public mode is selected by operating the switch.

First of all, a description will now be made of the process operation for setting the reception channel in the private mode.

In the reception-channel setting process operation of FIG. 4, when the mode selecting switch is set to the private mode, such a mode representation that the private mode, is selected as the reception mode is made at a first step T1. At the next step T2, a reception of a first private control carrier is set. A series of process operations defined after this step T2 is identical to the above-described process operation for setting the private control, as defined after the step S1, in the first portable telephone shown in FIG. 2. That is, at a step T3, a check is done as to whether or not an ID code of a specific transmission source which is coincident with an ID code of a radio base station stored in the ROM 13, has been received. When no detection is made within a predetermined time period that the specific ID code of the transmission source is detected, the process operation is advanced from the step T3 to step T4 at which a judgement is made whether or not the scanning operation of all of these private control carriers has been completed. If this scanning operation of the private control carriers has not yet been accomplished, then other private control carriers are set for reception at a step T5, and then the process operation is returned to a step T3. At the step T3, a check is done as to whether or not the ID code reception of the specific transmission source is detected.

At the step T3, when the specific ID code of the transmission source can be detected, the process operation is advanced to a step T6 at which a check is done whether or not a synchronization has been established. At the step T6, if it is judged that the synchronization can be established, then the following processes are commenced from a step T7 to a step T10. That is, at the first step T7, such an indication is made that a telephone communication is available between this first portable telephone and the relevant private radio base station. Thereafter, another check is done whether or not the synchronization is still maintained at the step T8, a further check is made whether or not a telephone call is made at the next step T9, and also a still further check is done whether or not the key for making such a telephone call is operated at the step T10. A series of these steps T7 to T10 is repeatedly performed, namely the normal telephone call waiting condition is performed.

Then, at the previous step T8 if a detection is made of an asynchronous state, the process operation is returned to a step T2 at which the process for setting the reception channel is again executed. At the step T9 if a telephone call is detected, then the process operation is advanced to a further step T11. At this step T11, a calling process to drive the ringer 16 and the like is performed. At the step T10 if a telephone call is detected, then the process operation is advanced to a step T12 where such a call making process is carried out. That is, a signal for requesting a communication channel allocation and a telephone call is transmitted to the relevant radio base station in the control channel under reception, namely the private control channel.

It should be noted that when it is judged that the search operations of all of the private control carrier have been completed at the step T4, then the process operation is advanced to a step T13 at which such an indication is made that this portable telephone is present outside the telephone service area.

Referring now to the flow chart of FIG. 5, a process operation for setting a reception channel in the public mode will be explained.

When the mode selecting switch is manipulated to set the public mode, at a first step U1, a representation that the private mode is set as the reception mode is made. At the subsequent step U2, a first public-use control carrier reception is set. A process operation defined after this step U2 is identical to the process operation for setting the public control channel effected in the first portable telephone, and defined after the step S10 shown in FIG. 2. That is to say, at a step U3, a judgement is made as to whether or not a synchronization is established between this second portable telephone and any one of the public radio base stations. If no synchronization can be established between this second portable telephone and any one of the public radio stations within a predetermined time period, the process operation is advanced to a step U4 at which a check is done whether or not the scanning operations for all of the public control carriers have been ended. If the scanning operations of all of the public control carriers have not yet been accomplished, then the process operation is advanced to a step U5 at which a reception of another public control carrier is set. Subsequently, the process operation is returned to the step U3 at which the above-described process for judging whether or not the synchronization is established, is similarly performed.

To the contrary, if it is detected at the step U3 that the synchronization can be done between the first portable telephone and any one of these public radio base stations, the process operation is advanced to a step U6. At this step U6, such an indication is made that a telephone communication is available between the second portable telephone and the public radio communication station. Subsequently, after such an indication is made that this second portable telephone is located within the public telephone service area, the above-described signal receiving state is entered. Under this normal reception waiting condition, a judgement process (step U7) for judging whether or not the synchronization is maintained, another judgement process (step U8) for judging whether or not a telephone call is issued, and a further judgement process (step U9) for judging whether or not a key operation to issue a telephone call is performed, are repeatedly carried out.

If this synchronization becomes asynchronous under the signal reception condition, then such an asynchronous state is detected at the step U7 and the process operation is returned to the step U2 at which the process for setting the reception channel is rescheduled. If a telephone call is made under the signal reception condition, then the telephone call is detected at the step U8 and the process operation is advanced to a step U10 at which a calling process for driving the ringer 16 is performed. If a telephone call is detected at a step U9, then the process operation is advanced to a step U11 at which a telephone-call making process is performed (will be explained later).

It should be noted that when it is judged that the search operations of all of the public control carriers have been completed at the step U4, then the process operation is advanced to a step U12 at which such an indication is made that this portable telephone is present outside the telephone service area.

DETAILED TELEPHONE-CALL MAKING PROCESS IN SECOND PORTABLE TELEPHONE

The above-explained telephone-call making process defined at the step U11 of FIG. 5 will now be described more in detail with reference to another flow chart shown in FIG. 6.

Figure 6:
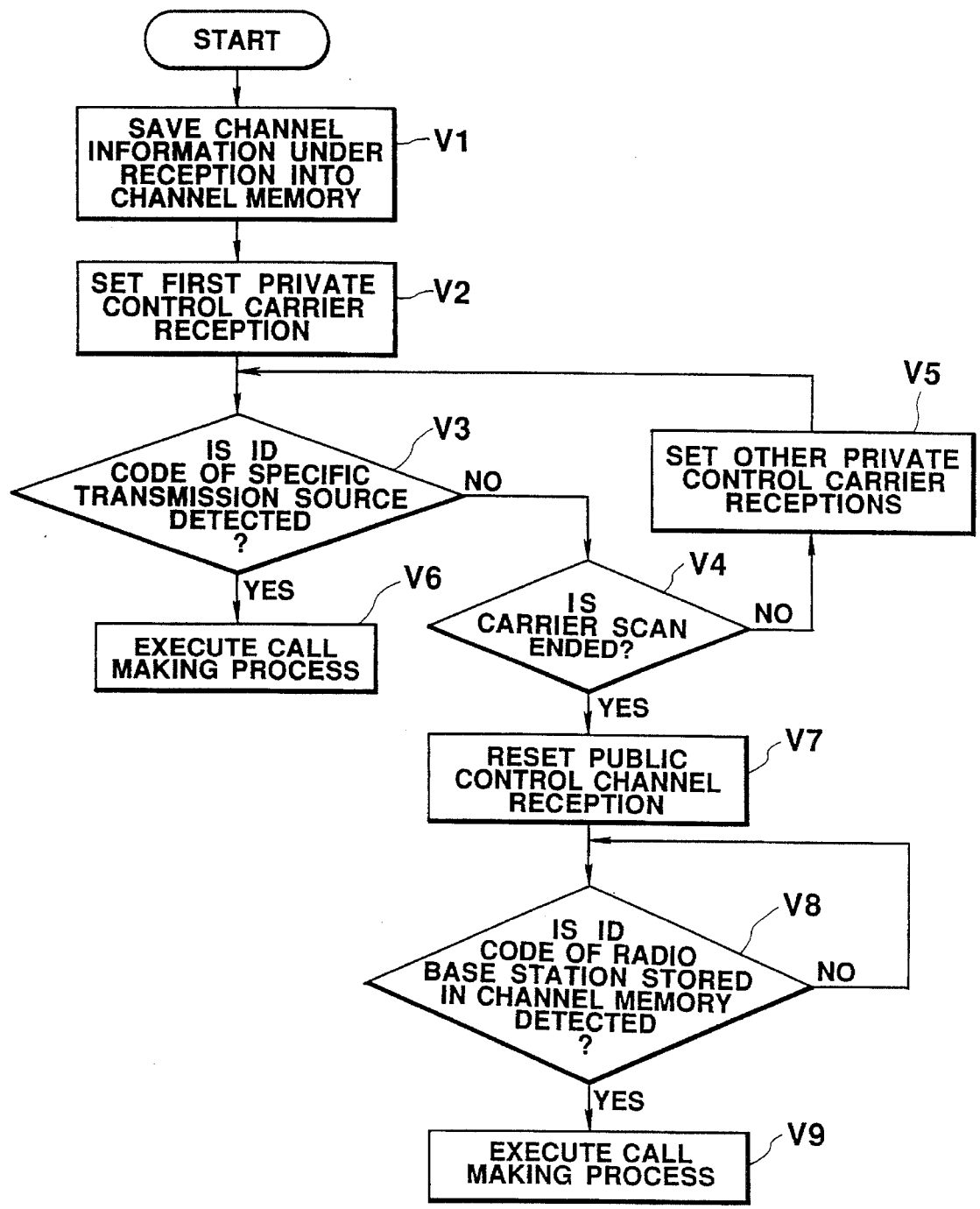
FIG. 6 is a flow chart for indicating a process operation performed when a calling channel is set.

If a detection is made at the step U9 of FIG. 5 that the key operation to make a telephone call is performed, the process operation is advanced to a step V1 of the flow chart shown in FIG. 6. At this first step V1, a channel information saving process is carried out where the channel information about the public control channel under reception is stored into the channel memory unit employed in the RAM 17. It should be noted that this channel information saving process is unnecessary for such a structure of a portable telephone that when the synchronization of the reception channel is established, the channel information about this reception channel is stored into the channel memory of the RAM 17. Thus, after the channel information about the channel under reception at the first step V1 has been saved to the channel memory, the process operation is advanced to a step V2 at which the first private control carrier is set to be received. A process operation defined from this step V2 up to a step V5 is the same as the process operation to detect the private control channel as defined from the step S1 to the step S4 in the first portable telephone shown in FIG. 2. In other words, at the step V3, a check is done as to whether or not a reception can be made of the ID code of the specific transmission source, which is identical to the ID code of the radio base station stored in the ROM 13. When no detection is made within a predetermined time period that the ID code of the specific transmission source is detected, the process operation is advanced from the step V3 to a step V4 at which a judgement is made whether or not the scanning operation of all of these private control carriers has been completed. If this scanning operation of the private control carriers has not yet been accomplished, then other private control carriers are set for reception at a step V5, and then the process operation is returned to a step V3. At this step V3, a judgement is made as to whether or not the ID code of the specific transmission source can be detected.

When the ID code of the specific transmission source can be detected at the step V3, namely the ID code of the radio base station for the cordless telephone to which the second portable telephone belongs, the process operation is advanced to a step V6 at which a telephone-call making process is performed. In this telephone-call making process, a signal for requesting a communication channel allocation and a telephone call is transmitted to this radio base station.

On the other hand, when a judgement of the step V4 is made that the scanning operations of all of the private control carriers have been accomplished, the process operation is advanced to a step V7. At this step V7, based on the channel information stored in the channel memory area of the RAM 17 at the previous step V1, the reception of the public control channel which has been previously received is reset. Then, at the subsequent step V8, a waiting condition is established that the ID code of the public radio base station stored in the channel memory is detected.

If the ID code of this public radio base station is detected at the step V8, the process operation is advanced to a step V9. Accordingly, such a telephone-call making process is performed at the step V9 by which a signal for demanding a communication channel allocation and a telephone call is transmitted to this public radio base station.

As previously explained, in accordance with the second preferred embodiment of the present invention, when the reception channel is set to the public control channel, the private control channel is searched during a telephone call. When a detection is made of the ID code of the radio base station for the cordless telephone to which this second portable telephone belongs, the channel information about the control channel set by this radio base station is received. Based on this channel information reception, the signal for demanding the communication channel allocation and the telephone call is transmitted to the radio base station of the cordless telephone to which the second portable telephone belongs. As a consequence, a telephone communication fee can be reduced, as compared with that of the conventional portable telephone.

ARRANGEMENT OF THIRD PORTABLE TELEPHONE

Figure 8:
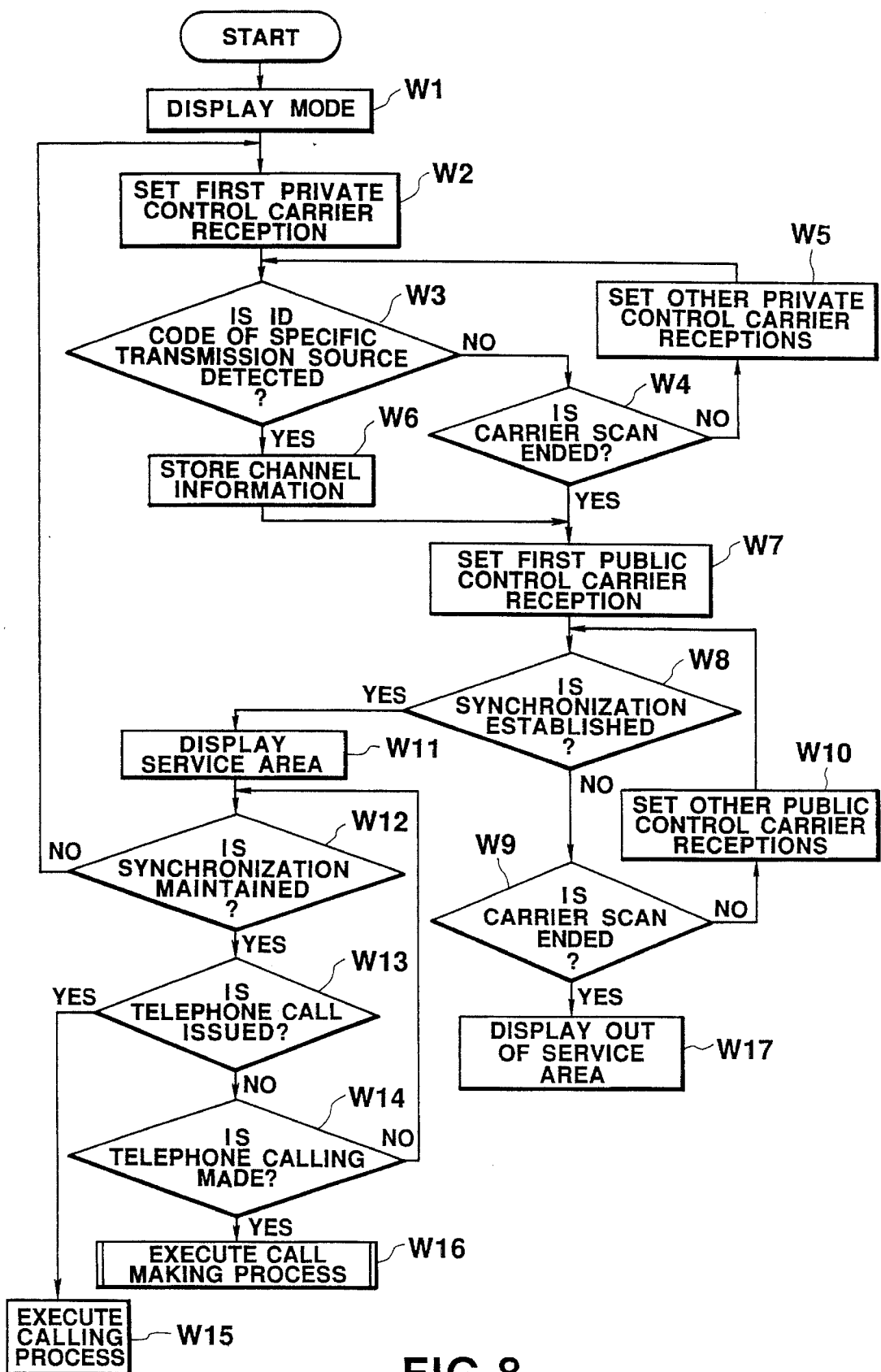
FIG. 8 is a flow chart for explaining a process operation performed when a public reception channel is set.
Figure 9:
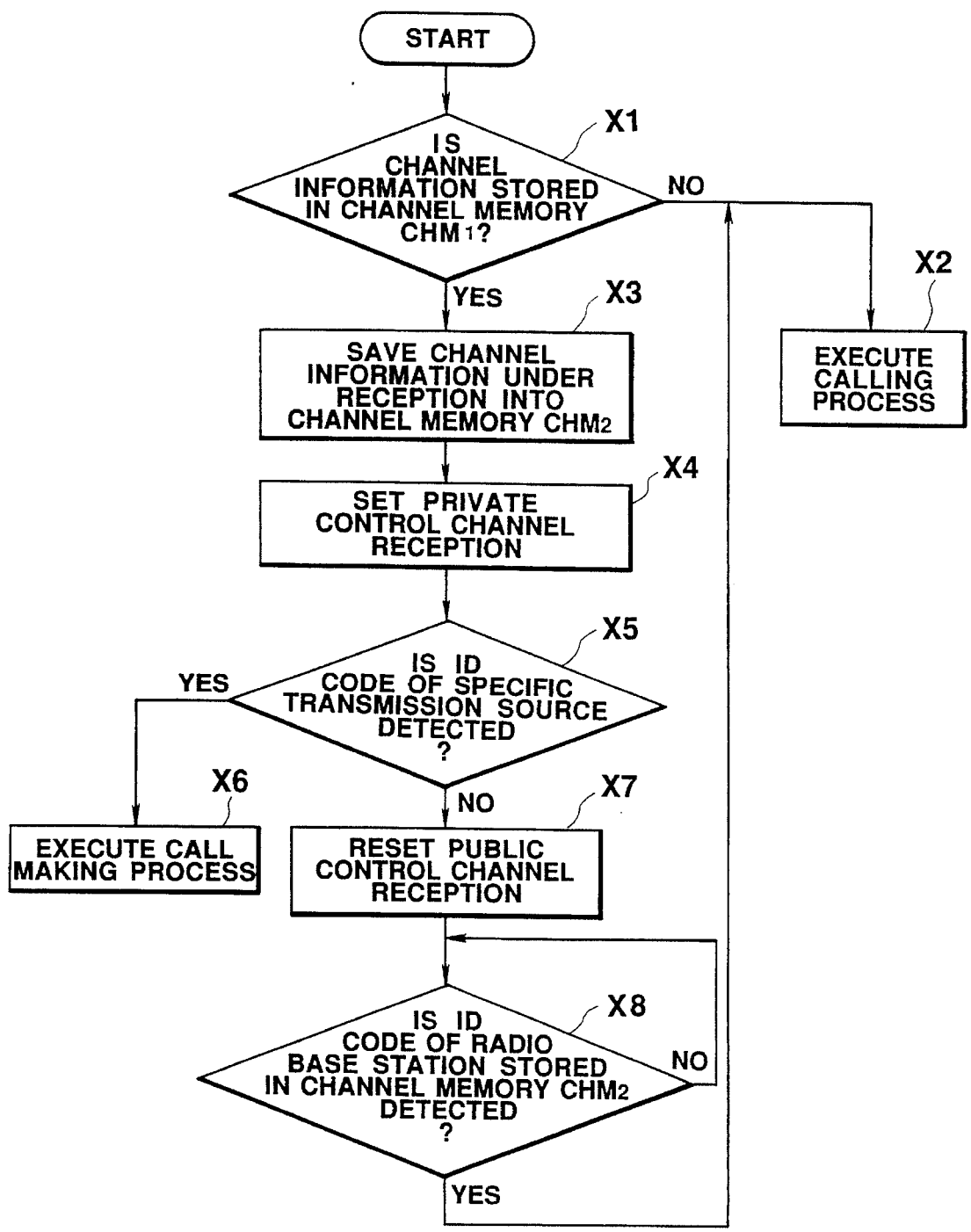
FIG. 9 is a flow chart for indicating a process operation executed when a calling channel is set.

A description will now be provided of a portable telephone according to a third preferred embodiment of the present invention with reference to FIGS. 7 to 9.

A major feature of this third portable telephone is such that a manual operable switch is employed to select as the reception channel, either the private-use control channel, or the public-use control channel. Furthermore, according to the major feature of the third portable telephone, when the public-use control channel is selected as the reception channel, a search is newly made of the private-use control channel in case that a reception channel is set. Then, when the ID code of the radio base station for the cordless telephone to which this third portable telephone belongs, is detected, the channel information about the control channel set by this radio base station is stored. When a telephone call is made, the private control channel is set based on the stored channel information so as to call the radio base station of the cordless telephone to which the third portable telephone belongs.

It should be noted that since an arrangement of the third portable telephone is substantially identical to that of the first portable telephone, no illustration thereof is made, but only a different point between them will now be explained. The third portable telephone executes the above-described telephone call process. A featured structure of the third portable telephone is such that both of a private channel memory and a public channel memory are employed in the RAM 17. The private channel memory stores channel information about the control channel where the radio base station of the cordless telephone to which this third portable telephone belongs, and which is detected when the public control channel is set. The public channel memory stores the information about the public control channel which has been set as the reception channel. While a telephone call is made, a telephone communication is executed based on the channel information stored in the private channel memory.

FIG. 7 schematically shows a memory content of these channel memories CHM1 and CHM2. In the private channel memory CHM1, there are provided memory areas for storing a carrier number and a slot number used to specify a carrier and a time slot employed in the searched private control channel, and also transmission period information indicative of the transmission period of the control channel. In the public channel memory CHM2, there are provided such memory areas for storing a carrier number and a slot number used to specify a carrier and a time slot, which are used in the public control channel, transmission period information indicative of a transmission period of a control channel, and an ID code of a public radio base station.

THIRD RECEPTION CHANNEL SETTING PROCESS

A process operation for setting a reception channel in the third portable receiver will now be explained. As previously stated, in accordance with the third preferred embodiment of the present invention, the reception channel is selected to be either the private control channel, or the public control channel by manipulating the manual operable switch. Since a process operation to set a reception channel when a private mode is selected is completely identical to that of the second preferred embodiment shown in FIG. 4, no further explanation thereof is made in the following specification. Only a description will now be made of a process operation to set a reception channel when a public mode is selected.

FIG. 8 shows a flow chart of a process operation for setting a reception channel when a public mode is selected.

In the reception-channel setting process operation of FIG. 8, when the mode selecting switch is set to the public mode, such a mode representation that the public mode is selected as the reception mode is made at a first step W1. At the next step W2, a reception of a first private control carrier is set. A series of process operations defined after this step W2 to a step W5 is identical to the above-described process operation for setting the private control as defined after the step S1 to the step S4, in the first portable telephone shown in FIG. 2. That is, at a step W3, a check is done as to whether or not an ID code of a specific transmission source which is coincident with an ID code of a radio base station stored in the ROM 13, has been received. When no detection is made within a predetermined time period that the ID code of the specific transmission source is detected, the process operation is advanced from the step to a step W4 at which a judgement is made whether or not the scanning operation of all of these private control carriers has been completed. If this scanning operation of the private control carriers has not yet been accomplished, then other private control carriers are set for reception at a step W5, and then the process operation is returned to a step W3. At this step W3, a check is done as to whether or not the ID code reception of the specific transmission source is detected.

At this step W3, if the ID code of the specific transmission source can be detected, then the process operation is advanced to a step W6 at which the channel information such as the carrier number, the slot number, and the transmission period information is stored in the private channel memory CHM1 employed in the RAM 17.

After the process operation defined at this step W6 has been ended, otherwise when it is judged at the step W4 that the scanning operations of all of the private control carriers have been accomplished, the process operation is advanced to a step W7 at which the reception of the first public control carrier is set. A process operation defined after this step W7 is the same as the process operation for setting the public control channel, as defined after the step S10 in the first portable telephone shown in FIG. 2. That is, at the step W8, a judgement is done as to whether or not a synchronization is established between the third portable telephone and any one of the public radio base stations. If no synchronization can be established between this third portable telephone and any one of the public radio stations within a predetermined time period, the process operation is advanced to a step W9 at which a check is done whether or not the scanning operations for all of the public control carriers have been ended. If the scanning operations of all of the public control carriers have not yet been accomplished, then the process operation is advanced to a step W10 at which receptions of other public control carriers are set. Subsequently, the process operation is returned to the step W8 at which the above-described process for judging whether or not the synchronization is established, is similarly performed.

To the contrary, if it is detected at the step W8 that the synchronization can be done between the third portable telephone and any one of these public radio base stations, the process operation is advanced to a step W11. At this step W11, such an indication is made that a telephone communication is available between the third portable telephone and the public radio communication station. Thereafter, the process operation is entered into a normal reception condition. Under this normal reception waiting condition, a judgement process (step W12) for judging whether or not the synchronization is maintained, another judgement process (step W13) for judging whether or not a telephone call is issued, and a further judgement process (step W14) for judging whether or not a key operation to issue a telephone call is performed, are repeatedly carried out.

If this synchronization becomes asynchronous under the signal reception condition, then such an asynchronous state is detected at the step W12 and the process operation is returned to the step W2 at which the process for setting the reception channel is rescheduled. If a telephone call is made under the signal reception condition, then the telephone call is detected at the step W13 and the process operation is advanced to a step W15 at which a calling process for driving the ringer 16 is performed. If a telephone call is detected at a step W14, then the process operation is advanced to a step W16 at which a telephone call making process is performed (will be explained later).

It should be noted that when it is judged that the search operations of all of the public control carriers have been completed at the step W9, then the process operation is advanced to a step W17 at which such an indication is made that this portable telephone is present outside the telephone service area.

DETAILED TELEPHONE-CALL MAKING PROCESS IN SECOND PORTABLE TELEPHONE

The above-explained telephone-call making process defined at the step W16 of FIG. 8 will now be described more in detail with reference to another flow chart shown in FIG. 9.

If a detection is made at the step W14 of FIG. 8 that the key operation to make a telephone call is performed, the process operation is advanced to a step X1 of the flow chart shown in FIG. 9. At this step X1, a check is done whether or not the channel information has been stored into the private channel memory CHM1 employed in the RAM 17. If the channel information has not been stored in this private channel memory, then the process operation is advanced to a step X2 at which a telephone-call making process is performed in the control channel under reception, namely the public control channel.

If the channel information has been stored in this private channel memory, the process operation is advanced to a step X3. At this step X3, a channel information saving process is carried out where the channel information about the public control channel under reception is stored into the public channel memory CHM2 employed in the RAM 17. It should be noted that this channel information saving process is unnecessary for such a structure of a portable telephone that when the synchronization of the reception channel is established, the channel information about this reception channel is stored into the public channel memory CHM2 of the RAM 17. Thus, after the channel information about the channel under reception at the step X3 has been saved to the channel memory CHM2, the process operation is advanced to a step X4 at which the first private control carrier is set to be received based on the channel information stored in the private channel memory CHM1 of the RAM 17.

After the reception of the private control channel has been set, the process operation is advanced to a step X5. At this step X5, a check is done whether or not the ID code of the specific transmission source has been received, this ID code being coincident with the ID code of the radio base station stored in the ROM 13. This detection judgement is continued for such a time period that the information for reporting the call acceptance timing can be surely received from the radio base station based on the transmission period information stored as one of the channel information. At the step X5, when the ID code of the specific transmission source is detected, namely when the ID code of the radio base station for the cordless telephone to which this third portable telephone belongs, the process operation is advanced to a step X6 at which a telephone-call making process is performed in the private control channel.

On the other hand, if no detection can be made of the ID code of the specific transmission source within a predetermined time period, the process operation is advanced to a step X7. At this step X7, based on the channel information stored in the public channel memory area CHM2 of the RAM 17, the reception of the public control channel which has been previously received is reset. Then, at the subsequent step X8, a waiting condition is established that the ID code of the public radio base station stored in the channel memory CHM2 is detected.

If the ID code of this public radio base station is detected at the step X8, the process operation is advanced to the previous step X2. Accordingly, such a telephone-call making process is performed at the step X2 by which a signal for demanding a communication channel allocation and a telephone call is transmitted to this public radio base station.

As previously explained, in accordance with the third preferred embodiment of the present invention, when the reception channel is set to the public control channel, the private control channel is also searched when the reception channel is set and the reception channel is reset in case of the asynchronous condition. When a detection is made of the ID code of the radio base station for the cordless telephone to which this second portable telephone belongs, the channel information about the control channel set by this radio base station is stored. When a telephone call is made, the private control channel is set based on the stored information. Since the signal for demanding the communication channel allocation and the telephone call is transmitted to the radio base station of the cordless telephone to which the second portable telephone belongs, a telephone communication fee can be reduced, as compared with that of the conventional portable telephone.

What is claimed is:

1. In a radio telephone system that includes at least one private radio base station, a plurality of public radio base stations, and a portable telephone provided with a manually operable switch for making a telephone call, which telephone is capable of setting a radio channel to communicate with said private radio base station and/or said public radio base station, a radio channel setting method of the portable telephone comprising the steps of:

detecting operation of said manually operable switch;

searching for a radio signal transmitted from said private radio base station for a predetermined time duration, when the operation of said manually operable switch is detected;

setting a radio communication channel with said private radio base station when the radio signal of said private radio base station can be detected during the predetermined time duration; and setting a radio communication channel with one of said plurality of public radio base stations, from which a radio signal is received before said manually operable switch is operated, when the radio signal of said private radio base station cannot be detected during the predetermined time duration.

2. A radio channel setting method as claimed in claim 1, wherein said portable telephone can be alternatively set to a first mode in which a radio communication channel is set between said at least one portable telephone and said private radio base station, and to a second mode in which a radio communication channel is set between said at least one portable telephone and said plurality of public radio stations; and wherein the radio channel setting method further comprises the steps of:

searching for an ID code included in a transmitted radio signal when said second mode is set and also when said manually operable switch is operated;

storing channel data transmitted from said private radio base station, when an ID code of said private radio base station is detected during the ID code searching step in the second mode; and selecting and searching through a received radio signal based on the stored channel data to detect the ID code of said private radio base station, when said manually operable switch is operated.

3. A radio channel setting method as claimed in claim 1, wherein the step of searching through the received signal includes searching the ID code included in the radio signal transmitted from said private radio base station.

4. The radio channel setting method as claimed in claim 1, further comprising the step of:

storing information about a radio signal transmitted from a particular one of said plurality of public radio base stations when said radio signal is received, and wherein the step of setting a radio communication channel with one of said plurality of public radio base stations includes setting the radio communication channel with the public radio base stations based on the information stored at the step of storing the information.

5. The radio channel setting method as claimed in claim 4, wherein the step of storing information includes storing information indicative of a frequency of the radio signal transmitted from a particular one of said plurality of public radio base stations.

6. The radio channel setting method as claimed in claim 4, wherein the step of storing information includes storing information indicative of a frequency of the radio signal transmitted from a particular one of said plurality of public radio base stations, and information representative of a period or time interval at which said radio signal is transmitted.

7. In a radio telephone system including:

at least one private radio base station;

a plurality of public radio base stations; and a portable telephone being capable of exchanging signals with said at least one private radio base station and said plurality of public radio base stations, the portable telephone comprising:

signal receiving means for receiving a signal from said at least one private radio base station and said plurality of public radio stations;

a manually operable phone call switch; and base station selecting means for selecting said at least one private radio base station in case said manually operable phone call switch is operated while said signal receiving means is receiving a signal from one of said plurality of public radio base stations and selecting one of said plurality of public radio base stations from which said signal receiving means was receiving a signal before said manually operable phone call switch was operated, when said signal receiving means cannot receive a signal from said at least one private radio base station.

8. The portable telephone as claimed in claim 7, wherein said base station selecting means includes:

detecting means for searching an ID (identification) code for a radio base station contained in a signal received by said signal receiving means to detect an ID code of said at least one private radio station; and means for setting a radio communication channel with said at least one private radio base station when said detecting means detects an ID code of said private radio base station.

9. The portable telephone as claimed in claim 7, further comprising:

a mode selecting means for selecting one of a first mode for receiving the signal transmitted from said at least one private radio station and a second mode for receiving the signal transmitted from said plurality of public radio base stations, and wherein said base station selecting means is initiated by operation of said manually operable phone call switch, when said second mode is selected by said mode selecting means.

10. The portable telephone as claimed in claim 7, further comprising:

a mode selecting means for selecting a first mode for receiving the signal transmitted from said at least one private radio base station and a second mode for receiving the signal transmitted from said plurality of public radio base stations, and first storage means for storing information about the signal transmitted from said private radio base station when said signal receiving means receives the signal transmitted from said at least one private radio base station, and wherein said base station selecting means selects with a top priority the private radio base station based on the information stored in said first storage means when said manually operable switch is operated during the second mode selected by said mode selecting means.

11. The portable telephone as claimed in claim 10, wherein said information stored in said first storage means corresponds to information indicative of a frequency of the radio signal transmitted from said at least one private radio base station.

12. The portable telephone as claimed in claim 10, wherein said information stored in said first storage means corresponds to information indicative of a frequency of the radio signal transmitted from said at least one private radio base station, and information representative of a period or time interval at which said radio signal is transmitted by said at least one private radio base station.

13. The portable telephone as claimed in claim 7, further comprising:

storage means for storing information about the radio signal transmitted from a particular one of the plurality of public radio base stations that is selected as a communication station in a mode in which the radio signal transmitted from said plurality of public radio base stations is received; and wherein said base station selecting means selects one of said plurality of public radio base stations based on the information stored in said storage means when said private radio base station cannot be selected during the selection process of said private radio base station.

14. The portable telephone as claimed in claim 13, wherein said information in said storage means corresponds to information indicative of a frequency of the radio signal transmitted from said particular one of the plurality of public radio base stations.

15. The portable telephone as claimed in claim 13, wherein said information in said storage means corresponds to information indicative of a frequency of the radio signal transmitted from said particular one of the plurality of public radio base stations, and also to such information that represents a period, or time interval, at which said radio signal is transmitted.

16. A radio telephone system comprising:

a private radio telephone unit including at least one portable telephone and a private radio base station;

a plurality of public radio base stations; and a communication network for connecting said private radio telephone unit with said plurality of public radio base stations; and wherein said at least one portable telephone comprises:

a mode selecting means for selecting a first mode in which the signal transmitted from said private radio base station is received, and a second mode in which the signal transmitted from any one of said plurality of public radio base stations is received;

a manually operable phone call switch;

a base station selecting means for selecting said private radio base station at a top priority as a telecommunication station when said manually operable phone call switch is operated; and wherein said base station selecting means comprises:

means for searching the signal transmitted from said private radio base station prior to the searching operation of the signal transmitted from said plurality of public radio base stations when the second mode is selected in which the signal transmitted from said plurality of public radio base stations is received;

first storage means for storing information about the signal transmitted from said private radio base station when the signal transmitted from said private radio base station is detected by said search means;

a second storage means for storing information about the signal transmitted from a particular one of the plurality of public radio base stations that is selected as a communication station in said second mode in which the signal transmitted from said plurality of public radio base stations is received; and wherein said base station selecting means selects said private radio base station with a top priority based on the information stored in said first storage means when said manually operable phone call switch is operated and selects one of said plurality of public radio base stations based on the information stored in said second storage means when said private radio base station cannot be selected based on the information stored in said first storage means during the selection process of said private radio station.

17. A radio telephone system as claimed in claim 16, wherein said information stored in said second storage means corresponds to information indicative of a frequency of the radio signal transmitted from said particular one of the plurality of public radio base stations.

18. A radio telephone system as claimed in claim 16, wherein said information stored in said second storage means corresponds to information indicative of a frequency of the radio signal transmitted from said particular one of the plurality of public radio base stations, and also to such an information that represents a period, or time interval at which said radio signal is transmitted.

19. The radio telephone system as claimed in claim 16, wherein said information in said first storage means corresponds to information indicative of a frequency of the radio signal transmitted from said at least one private radio base station.

20. The radio telephone system as claimed in claim 16, wherein said information in said first storage means corresponds to information indicative of a frequency of the radio signal transmitted from said at least one private radio base station, and information representative of a period or time interval at which said radio signal is transmitted by said at least one private radio base station.

* * * * *

UNITED STATES PATENT AND TRADEMARK OFFICE
CERTIFICATE OF CORRECTION

PATENT NO. : 5,509,047
DATED : April 16, 1996
INVENTOR(S) : UCHIKURA, Takao

It is certified that error appears in the above-identified patent and that said Letters Patent is hereby corrected as shown below:

```
Column 15, line 28 (claim 1)
          "capable of" should be --operative for--;

line 29 (claim 1) "and/or" should be --and--.

Column 16, line 31 (claim 7)
          "capable of" should be --operative for--.
```

Signed and Sealed this

Twenty-first Day of April, 1998

Attest:

BRUCE LEHMAN

*Attesting Officer*        *Commissioner of Patents and Trademarks*